United States Patent
Bennett

(10) Patent No.: US 10,644,508 B2
(45) Date of Patent: *May 5, 2020

(54) PROGRAMMABLE ELECTRICAL CONTROL DEVICE

(71) Applicant: SMARTSWITCH PTY LTD, Armadale (AU)

(72) Inventor: Rob Bennett, Toorak (AU)

(73) Assignee: SMARTSWITCH PTY LTD, Armadale (AU)

( * ) Notice: Subject to any disclaimer, the term of this patent is extended or adjusted under 35 U.S.C. 154(b) by 0 days.

This patent is subject to a terminal disclaimer.

(21) Appl. No.: 16/153,749

(22) Filed: Oct. 6, 2018

(65) Prior Publication Data

US 2019/0044334 A1 Feb. 7, 2019

Related U.S. Application Data

(63) Continuation-in-part of application No. 15/834,967, filed on Dec. 7, 2017, now Pat. No. 10,116,137, which is a continuation of application No. 14/394,261, filed as application No. PCT/AU2013/000396 on Apr. 16, 2013, now Pat. No. 9,876,355.

(30) Foreign Application Priority Data

Apr. 20, 2012 (AU) ................................ 2012901567
Apr. 12, 2013 (AU) ................................ 2013204369

(51) Int. Cl.
| | | |
|---|---|---|
| H02J 3/14 | (2006.01) | |
| H04L 12/28 | (2006.01) | |
| G05B 19/04 | (2006.01) | |
| H05B 37/02 | (2006.01) | |
| G05B 15/02 | (2006.01) | |
| G06F 1/26 | (2006.01) | |

(52) U.S. Cl.
CPC ................ *H02J 3/14* (2013.01); *G05B 19/04* (2013.01); *G06F 1/266* (2013.01); *H04L 12/2803* (2013.01); *H05B 37/0272* (2013.01); *G05B 15/02* (2013.01); *G05B 2219/163* (2013.01); *G05B 2219/25011* (2013.01); *G05B 2219/2614* (2013.01); *G05B 2219/2642* (2013.01); *H02J 2003/143* (2013.01); *Y02B 20/42* (2013.01)

(58) Field of Classification Search
None
See application file for complete search history.

(56) References Cited

U.S. PATENT DOCUMENTS

| 4,570,216 A | * | 2/1986 | Chan | ..................... G04G 15/006 |
| | | | | 307/140 |
| 2013/0026947 A1 | * | 1/2013 | Economy | ................ H04W 4/70 |
| | | | | 315/287 |

* cited by examiner

*Primary Examiner* — Qing Yuan Wu
(74) *Attorney, Agent, or Firm* — Adenike Adebiyi

(57) ABSTRACT

A method of controlling electrical power supply through at least one electrical power supply output of an electrical supply device includes receiving switching time and/or duration data. The received switching time and/or duration data are processed with one or more of clock times and calendar dates to provide switching time and/or duration comprising at least one supply on period and at least one supply off period. Electrical power supply through the at least one electrical power supply output is controlled in accordance with the switching time and/or duration.

20 Claims, 14 Drawing Sheets

PROGRAMMABLE ELECTRICAL CONTROL DEVICE

CROSS-REFERENCE TO RELATED APPLICATIONS

This application is a continuation-in-part of U.S. patent application Ser. No. 15/834,967 filed 7 Dec. 2017, which is a continuation of U.S. patent application Ser. No. 14/394,261 filed 13 Oct. 2014, now U.S. Pat. No. 9,876,355, which is a national stage application of International Application No. PCT/AU2013/000396 filed 16 Apr. 2013, which claims priority to Australian Application No. 2012901567 filed 20 Apr. 2012 and Australian Application No. 2013204369 filed 12 Apr. 2013, the contents of which are incorporated herein in their entirety by reference.

FIELD OF THE INVENTION

The present invention is related to a programmable device for electrical power. In particular, the programmable device may be useful for electrical power outlets. Further, the programmable device may be especially useful for domestic power outlets.

BACKGROUND OF THE INVENTION

Electrical power is supplied to electrical devices, such as televisions, stereo systems, toasters, ovens and other domestic and non-domestic appliances, through power outlets, which usually are equipped with manual switches to allow turning on and turning off of the mains power supply to the electrical device. Further, lighting is controlled by electrical switching devices (often simply referred to as a light switch), which allows power supply to be turned on and turned off to the light.

Some electrical switching devices (power outlets, light switches and other like electrical switching devices) have only provided means for manually switching the power supply on and off. However, such manual switches do not provide for any automated switching, as is often desired by a user. Such automated switching may be desired for the purposes of power saving, switching electrical devices and lights on and off during absences from a property to simulate the effect of people being present for security, or for other purposes.

Sometimes power outlets do not have manual switches and power is always on, such that, when a device is plugged in it will have power delivered without the need for switching on the power supply via a manual switch.

Power outlets with and without manual off/on switches, and light switches may be referred to in this specification as electrical supply devices. Where a power outlet has manual switches, it may be referred to in this specification as an electrical switching device. Light switches may also be referred to in this specification as electrical switching devices.

Automated switching devices include mechanically or electrically operated timing devices, which can be plugged into a power outlet and then set to control the timing of when power is supplied to and cut off from an electrical device, such as a lamp. Electrical or mechanical timing devices for plugging into power outlets are problematic in that they are bulky, they are difficult to program, they do not have many programming options for on and off power periods, and they are often inaccurate. Another problem with mechanical devices is that they produce a lot of noise, they are expensive and they are not energy efficient because they consume a lot of power in operating a motor for the timing device.

Other devices include large, complex and sophisticated centralised power control systems, which are very expensive and complicated to install in a building which is being constructed. Such complex centralised power control systems are also more much more complicated to install (retrofit) in an already-built property. Further, these systems are difficult to program, as they often include many control options.

A problem with devices, as discussed above, is that they do not result in sufficiently effective saving of electrical power. Some of the devices are stated by manufacturers or others to be power saving devices, but, even if they do save power, the amount of power saved is relatively small. Often the devices do not result in a net saving of power due to the device itself consuming too much power during its operation.

One example prior art device is identified in European Patent Application No. 384881 (A1), in which the device is primarily addressed to safe operating. However, the device is relatively complex and contains many electrical components, which would result in a device which consumes a relatively large amount of electrical power in operation. Further, the device of this document does not include any sort of timing mechanism for switching on and switching off the electrical power supply.

Yet another example prior art device is disclosed in U.S. Pat. No. 5,278,771, which is a large device, again having many complex electrical components, which results in consuming relative large amounts of electrical power during operation. This device comprises a programming interface built into the device, which is not always readily accessible when the device is being used. Further, the programming interface is not simple to use and there is only one interface that can be provided with such a device, such that it is not possible to use other interfaces for programming the device according to a user's choice. Moreover, the device is configured so as to be completely external to an electrical power supply socket. Due to being situated externally, the device cannot operate particularly efficiently in order to save power with its timed power supply.

Yet another example prior art device is mentioned in U.S. Pat. No. 7,964,989, which comprises a unit that is completely external to an electrical power supply socket, and is plugged into such a socket, with an electrical device, such as a lamp, being plugged into the unit. The device of U.S. Pat. No. 7,964,989 is able to be operated by a remote control device, such as a computer tablet. However, the device does not have any in-built timing, so is restricted to being operated directly whenever a user desires to switch on or switch off electrical power supply to, for example, a lamp. In this regard, the device is unable to accept any programming instructions for operating times, wherein those times are stored within the device. Accordingly, for timed operation, this device would need to operate in conjunction with the computer tablet, wherein the tablet holds any timing instructions. This results in a problem that for timed switching operation, the device and the computer tablet must always be used together, which is likely to be an inconvenience for a user, and relies on the computer tablet to be working and operational during such desired switching periods. Further, this device, being externally located from the electrical power supply socket, has a similar problem to the device identified in U.S. Pat. No. 5,278,771, being that, as an external unit, it is relatively energy inefficient, and would not lead to sufficient saving of electrical power during operation.

It is an object of the present invention to overcome, or at least ameliorate, at least one of the above-mentioned problems in the prior art, and/or to overcome, or at least ameliorate, at least one problem in the prior art, which has not been mentioned above, and/or to provide at least a useful alternative to the prior art devices, systems and/or methods.

SUMMARY OF THE INVENTION

Accordingly, in one aspect, the present invention provides a programmable electrical control device adapted to be programmed by an external programming device, the programmable electrical control device for controlling electrical power supply in cooperation with an electrical supply device, the electrical supply device having a body, an electrical power supply input, at least one electrical power supply output, the programmable electrical control device comprising: a data connection module for communicating switching time data and/or duration data between the programmable electrical control device and the external programming device; memory for storing the switching time and/or duration data; a timing module for providing one or more of a clock time, a calendar date and a duration; a processor for processing the switching time data and/or duration data in accordance with one or more of the clock times and the calendar dates to provide switching time and/or duration; and a switching module controlled by the processor in accordance with the switching time and/or duration for controlling electrical power supply through the electrical power supply output, such that during the at least one supply on period the at least one electrical power supply output is able to supply electrical power, and during the at least one supply off period during the at least one electrical power supply output is unable to supply electrical power, wherein at least a part of the programmable electrical control device is capable of being integrated within the body.

In another aspect, the present invention provides an electrical control system including a programmable electrical control device, as described in the previous paragraph, wherein the programmable electrical control device is integrated with an electrical supply device, also as described in the previous paragraph.

In yet another aspect, the present invention provides a method of controlling electrical power supply through at least one electrical power supply output of an electrical supply device, comprising: receiving switching time and/or duration data; processing the received switching time and/or duration data with one or more of clock times and calendar dates to provide switching time and/or duration comprising at least one supply on period and at least one supply off period; and controlling electrical power supply through the at least one electrical power supply output in accordance with the switching time and/or duration such that during the at least one supply on period the electrical power supply output is able to supply electrical power and during the at least one supply off period the electrical power supply output is unable to supply electrical power.

In yet a further aspect, the present invention provides a method of controlling electrical power supply through at least one electrical power supply output of an electrical supply device, comprising: detecting one or more programmable electrical control devices for controlling electrical power supply; selecting a programmable electrical control device from the detected programmable electrical control devices; and transmitting switching time and/or duration data to the selected programmable electrical control device, wherein the switching time and/or duration data comprises supply on period data during which the electrical power supply output is able to supply electrical and supply off period data during which the electrical power supply output is unable to supply electrical power.

SUMMARY OF EMBODIMENTS OF THE INVENTION

In an embodiment, the data connection module includes a physical connector. The physical connector may be a universal serial bus (USB) port. In another embodiment, the data connection module includes a wireless connecter, wherein the wireless connector is any one of a Bluetooth® transceiver, a Wi-Fi® transceiver and/or an Infra-Red transceiver. If the wireless connector is a Bluetooth® transceiver, it may be a low energy transceiver, including an antenna. The data connection module could also allow communication over the internet, by providing some sort of internet connectivity. In this regard, the data connection module could also tie in with Cloud computing devices and methods.

In an optional embodiment, the timing module may be a real-time clock (RTC). In another optional embodiment, the switching module may be any one of a relay, a latching relay, a triode for alternating current (TRIAC), or any semiconductor switch.

In another optional embodiment, the timing module may not rely on a real-time clock, but could use some means for measuring duration of time, such as a device for measuring duration using frequency of the AC mains power supply. In such an embodiment, a user of the device 10 would switch on the device and select a time duration, wherein the device would be equipped to calculate or derive that time duration by counting the number of cycles, or some related regular event.

In one embodiment, the processor may be a microcontroller unit (MCU). In another embodiment, the processor may be integrated with any one or more of the data connection module, the memory and the timing module. In this regard, the MCU may include these components within the one processing unit.

In yet another embodiment, the programmable electrical control device includes an energy supply module for supplying electrical energy to any one or more of the data connection module, the memory, the timing module and the processor. Of course, where the processor includes the data connection module, the memory and the timing module, this energy supply provides all these components with electrical energy by supplying the processor. In some embodiments, the energy supply module includes a voltage regulator, which can operate to transform the mains supply AC current to a stepped-down DC voltage supply. In a further embodiment, the energy supply module includes an energy storage module, which may be, for example, a capacitor or a battery. If employing a battery, it may be a rechargeable type battery.

In yet another optional embodiment, the programmable electrical control device includes a synchroniser for synchronising the timing module. The synchroniser may use the electrical power supply for achieving synchronisation. In this regard, it will be understood by those skilled in the technology that an AC electrical supply is often provided within a frequency range, which can be analysed to provide such synchronisation. In another embodiment, it would be possible to set and/or synchronise the timing module by using the external programming device communicating over a chosen protocol, via the data connection module. In this regard, the external programming device may include specific programs for operating such setting and/or synchronisation of the timing module.

In some embodiments, the electrical supply device includes at least one manual switch for each associated power outlet, wherein the manual switch having on and off positions for, respectively, allowing electrical power supply through the associated power outlet and disallowing electrical power supply through the associated power outlet.

In an embodiment, where the electrical supply device includes manual switches, the programmable electrical device includes a manual switch monitor for determining whether the manual switch is in either the on position or in the off position.

In an embodiment, the electrical supply device is a power outlet and the electrical power supply output is a power outlet socket for accepting a plug of an electrical device, the power outlet socket including two or more pins/terminals for accepting two or more corresponding terminals/pins of the plug.

In another embodiment, the electrical supply device is an electrical switching device, which is a light switch, and the electrical power supply output is a light socket.

In a further embodiment, the data connection module is a USB port and the external programming device communicates with the programmable electrical control device using a communication protocol appropriate to USB. Alternatively, the data connection module is a Bluetooth® receiver/transmitter, a WiFi® receiver/transmitter or an infra-red receiver/transmitter, each using appropriate communications protocols. Moreover, the programmable electrical control device may include means for multiple different communication types, such as both WiFi® and Bluetooth®.

In yet another embodiment, the power outlet is a domestic power outlet, also known as a general purpose outlet (GPO), and the programmable electrical control device is positioned completely within the body of the domestic power outlet.

In an optional embodiment, the programmable electrical control device further includes an over-ride means, wherein, during a given supply off period, the manual switch can be switched on to over-ride the off state, such that the programmable electrical control device is changed to the on state and the electrical switching device is able to supply electrical power. The over-ride may be maintained until the end of the given supply off period.

In alternative embodiments, an over-ride means or function may be provided. In such embodiments, the over-ride means or function can over-ride a supply on period to stop electrical power supply. In other such embodiments, the over-ride means or function can over-ride a supply off period to allow electrical power supply. In yet other such embodiments, the over-ride means or function can over-ride a supply on period to stop electrical power supply and the over-ride means or function can over-ride a supply off period to allow electrical power supply. In some such embodiments, the over-ride means or function is operable remotely from the programmable electrical control device on the external programming device.

In another optional embodiment, the programmable electrical control device further includes an indicator for indicating a state of the programmable electrical control device. The indicator maybe a light (for example, a LED) positioned in the face-plate of the power outlet.

In a further optional embodiment, the data connection module is a separate device that is pluggable into at least one terminal/pin of the power outlet socket, and wherein the at least one terminal/pin of the power outlet socket is connected for data transmission between the data connection module and the programmable electrical control device. The separate data connection module may further include an indicator for indicating a state of the programmable electrical control device.

BRIEF DESCRIPTION OF THE DRAWINGS

Various embodiments of the invention will be described with reference to the following, non-limiting illustrations representing an embodiment of the present invention.

FIG. 1 also shows (not to scale) electrical devices plugged into the power outlet. Further, FIG. 1 shows (not to scale) the programmable electrical control device being programmed via various external programming devices, including: a laptop computer (via a USB port), a smart phone, or similar and a laptop computer (each either via Wi-Fi® or Bluetooth®);

DETAILED DESCRIPTION OF EMBODIMENTS OF THE INVENTION

Figure 1:
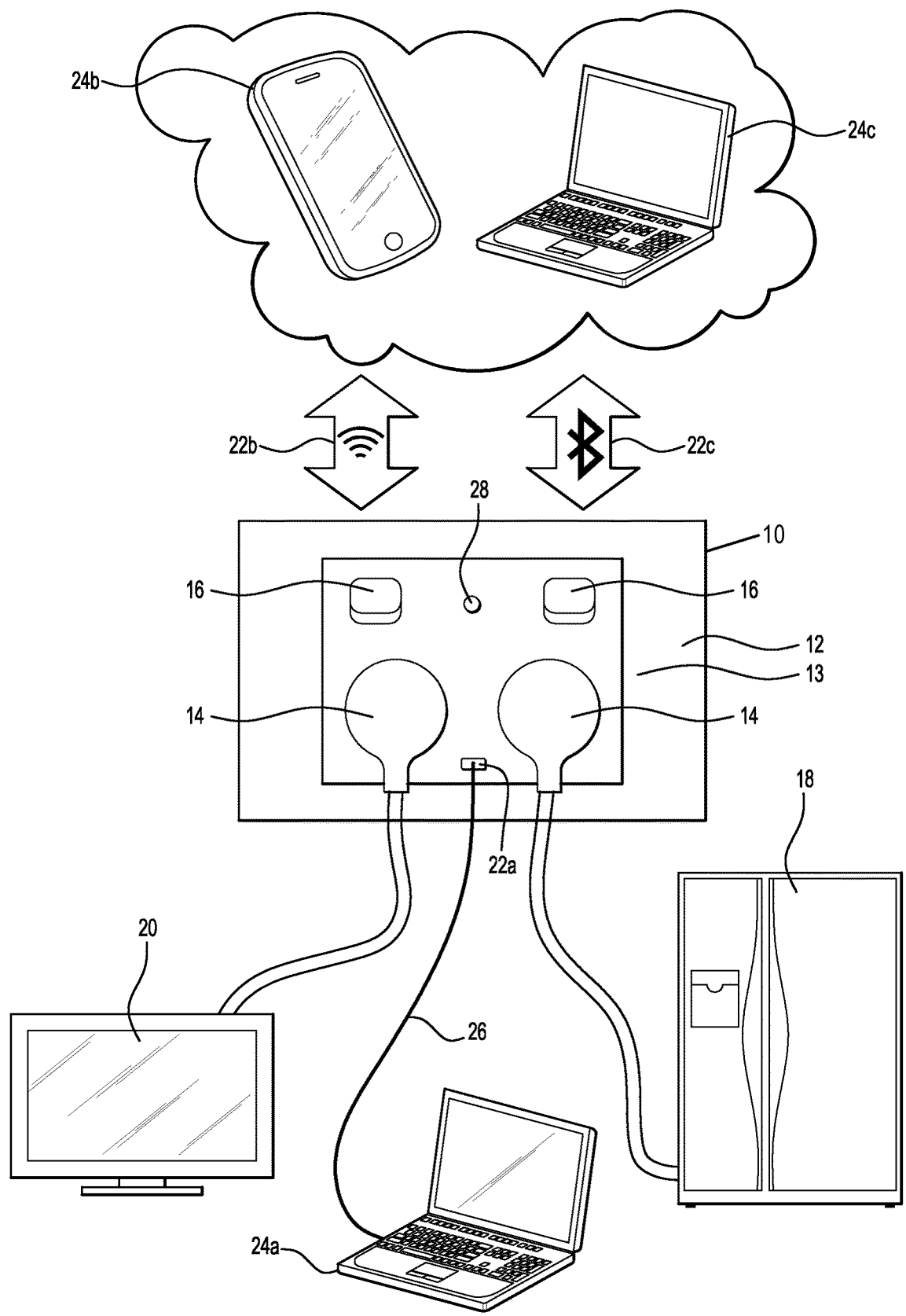
FIG. 1 is a front elevation view of an embodiment of the present invention, implemented in a domestic power outlet.

FIG. 1 shows an example implementation (embodiment) of the present invention. In this embodiment, the programmable electrical control device 10 is implemented for controlling electrical power supply for an electrical switching device (a domestic power outlet) 12. The electrical power outlet includes a body (not shown) a face plate 13 and manual switches 16 for turning on and off mains power supply through the power outlet sockets (GPOs) into which are inserted plugs 14 of electrical devices (a fridge 18 and a visual display unit 20). In other embodiments, the programmable electrical control device 10 is implemented for controlling electrical power supply for an electrical supply device without manual on/off switches.

FIG. 1 also shows various methods and devices (program input devices) by which instructions for switching times for the electrical switching device 12 may be input to the programmable electrical control device 10 by an external programming device.

In one embodiment, the data connection module is a USB port 22a. In this embodiment, the USB port is shown connected to a laptop computer 24a via a USB cable 26. The laptop computer contains programming software for programming the programmable electrical control device with instructions for switching times to be communicated via a chosen communication protocol over USB. The software may also be able to receive information transmitted from the programmable electrical control device via the USB port 22a, including a present state of switching times for the programmable electrical control device 10.

In other embodiments, the external programming device may be, for example, a smartphone 24b or a laptop computer 24c. Such external programming devices may communicate with the programmable electrical control device 10 each via either a Wi-Fi® link 22b or a Bluetooth® link 22c, using the appropriate communication protocol. Similarly to the embodiment where the program input is a USB port 22a, the Wi-Fi® link 22b and the Bluetooth® link 22c may allow both transmission of signals carrying instructions for switching times (switching time data) from the external programming device to the programmable electrical control device 10, as well as transmissions from the programmable electrical control device 10 to the external programming device 24b, 24c. The transmissions from the programmable electrical control device 10 showing, for example, the present state of switching times.

In other embodiments of the present invention, the external programming device may be a tablet, such as an iPad®, an Android® tablet or smart phone device, or similar devices. Further, the external programming device maybe a remote control communicating via infrared, or any other suitable device, which can communicate via wireless or nonwireless means.

In a further example embodiment, the programmable electrical control device 10 may also include an indicator for showing connection to a program input device via Wi-Fi® 22b or Bluetooth® 22c. In the embodiment shown in FIG. 1, the indicator is a light 28, which is located in the faceplate 13 of the power outlet 12.

Figure 2:
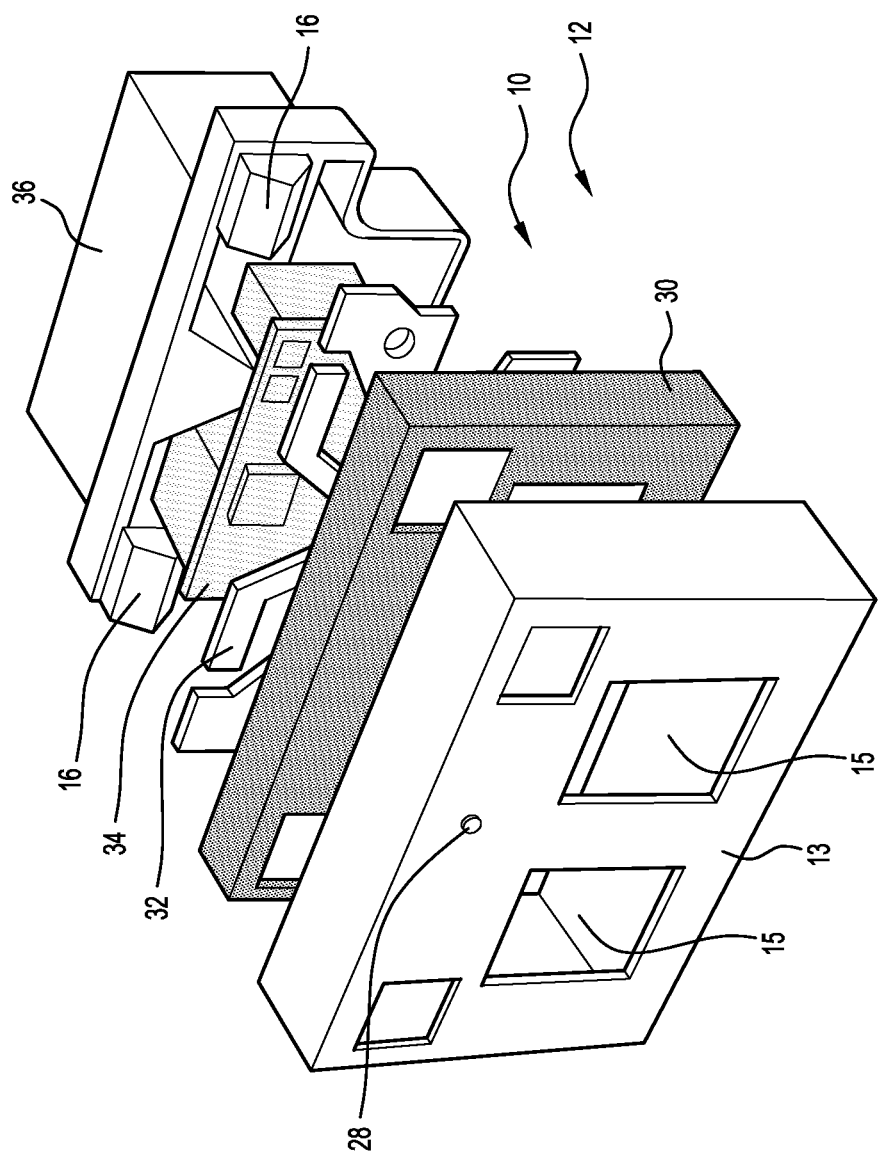
FIG. 2 is an exploded perspective view of an embodiment of the present invention implemented in a domestic power outlet, having two power sockets or GPOs.

FIG. 2 shows an embodiment of the programmable electrical control device 10, which is implemented in an electrical power outlet having two outlet sockets 15 (the terminals of the outlet sockets are not visible in FIG. 2), also known as GPOs. The electrical power outlet 12 is a domestic type power outlet including a based plate 30, bus bars 32 and a back housing 36. The programmable electrical control device 10, in this embodiment, includes a printed circuit board 34 (PCB), which include hardware components of the device 10.

In this embodiment, the electrical switching device (power outlet 12) includes a Bluetooth® pairing indicator 28, which may be an LED configured to indicate when the device 10 and an external programming device are in a paired state.

It can be seen in FIG. 2 that all of the main components of the device 10 are fully integrated within the body of the electrical switching device (power outlet 12). In this way, the electrical power outlet 12 can be sold with the programmable electrical control device 10 as a single unit. Furthermore, providing the programmable electrical device within the electrical switching device should result in a more efficient operation for the programmable electrical control device, thus leading to savings in power consumption. In this regard, the programmable electrical control device is located between the electrical power supply input and each electrical power supply output (in FIG. 2 the electrical power supply output comprises the outlet sockets 15). This configuration can be compared with prior art configurations, wherein allegedly power saving devices are located externally to the electrical switching device (the power outlet socket), which results in relatively inefficient operation and consumption of more electrical energy for that operation.

In other embodiments, the power outlet 12 may be an electrical supply device without manual switches. In such embodiments, the electrical power supply is controlled by the programmable electrical control device 10 alone, such that during a supply on period the power outlet 12 supplies electrical power and during a supply off period the power outlet does not supply electrical power.

Figure 3:
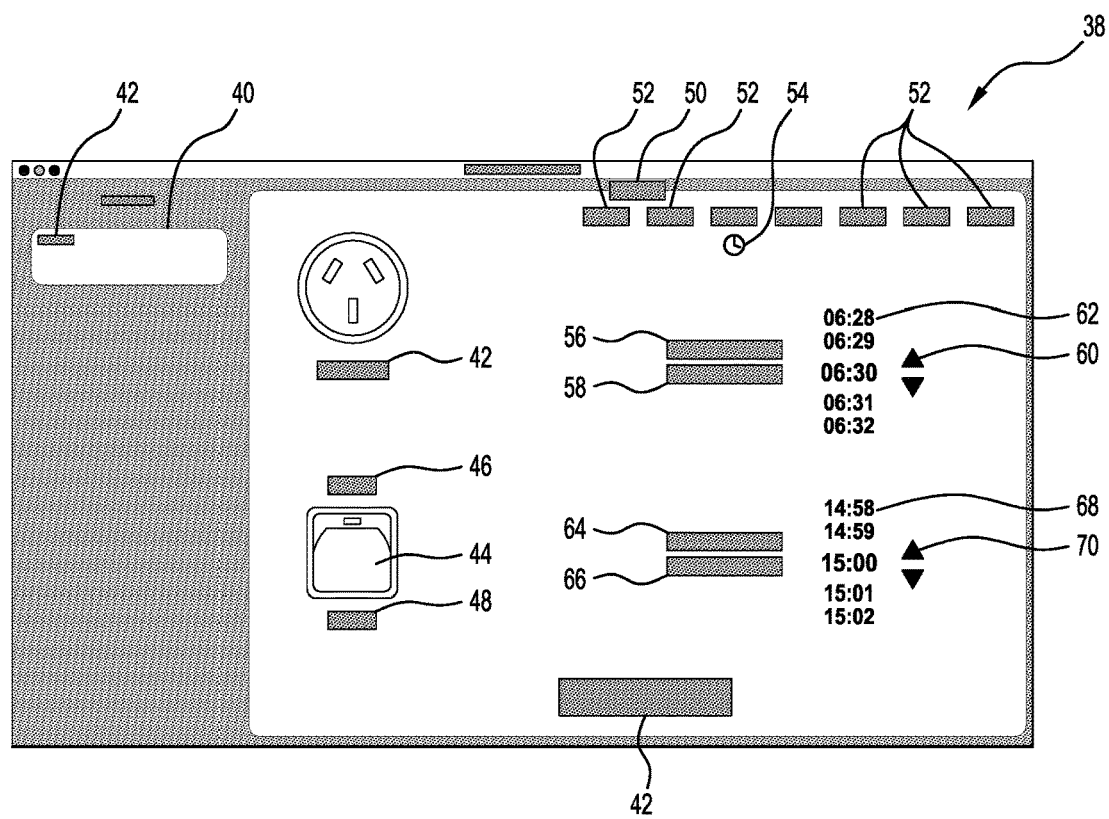
FIG. 3 shows a screen shot of an optional version of an operating interface on an external programming device, to be used with an embodiment of the present invention.

FIG. 3 is an example screen shot for an operating interface 38 in a software application, which can be run on an external programming device, such as a laptop, a smartphone, or other like computing devices.

To the left of the operating interface 38, there is a switch list 40, which includes the names 42 of electrical switching devices or electrical supply devices that include the programmable electrical control device 10, and are therefore available for programming by the external programming device. For example, the name may be "KITCHEN", thus indicating that the electrical supply device is located in the kitchen, the electrical supply device name 42 can also operate as a button, which can be clicked to cause timing and other details of that particular electrical supply device (or GPO having a device 10) to appear in the right hand side of the operating interface 38.

In the right hand side of the interface 38 there is shown a switch on/off indicator 44, with an "ON" indicator 46 and an "OFF" indicator 48. There is also a button 50 for selecting between an "SIMPLE" or "ADVANCED" interface display. In the embodiment illustrated, the "SIMPLE" interface 38 is shown.

The interface also includes days of the week indicators 52, along with an indicator 54 to show which day of the week is selected to be programmed. In this example, the day of the week selected is "WEDNESDAY".

Below the days of the week 52, there is shown the start and stop programming facilities, with a "TIMER START" button 58 above which is the selected day of the week ("WEDNESDAY") 56. Next to the "TIMER START" 58 there is a time list 60 in one minute increments, along with a forward/back time selection scroll button 62.

Similarly, below the start programming facilities, there are the stop programming facilities, including an indicator of the selected day of the week 64 and the "TIMER STOP" indicator 66, along with the time list 68 and the forward/back time selection scroll button 70.

As shown in this example operating interface 38, the electrical supply device (or GPO) name can be shown in multiple locations for clarity. It will be also understood that where icons, words or numbers appear on the operating interface 38, these can function as indicators only or as indicators and clickable buttons. Such clickable buttons can operate in software applications to cause data entry, changes and/or deletion, and can also operate to cause the software application to display a new interface, or a new part of the interface.

Figure 4:
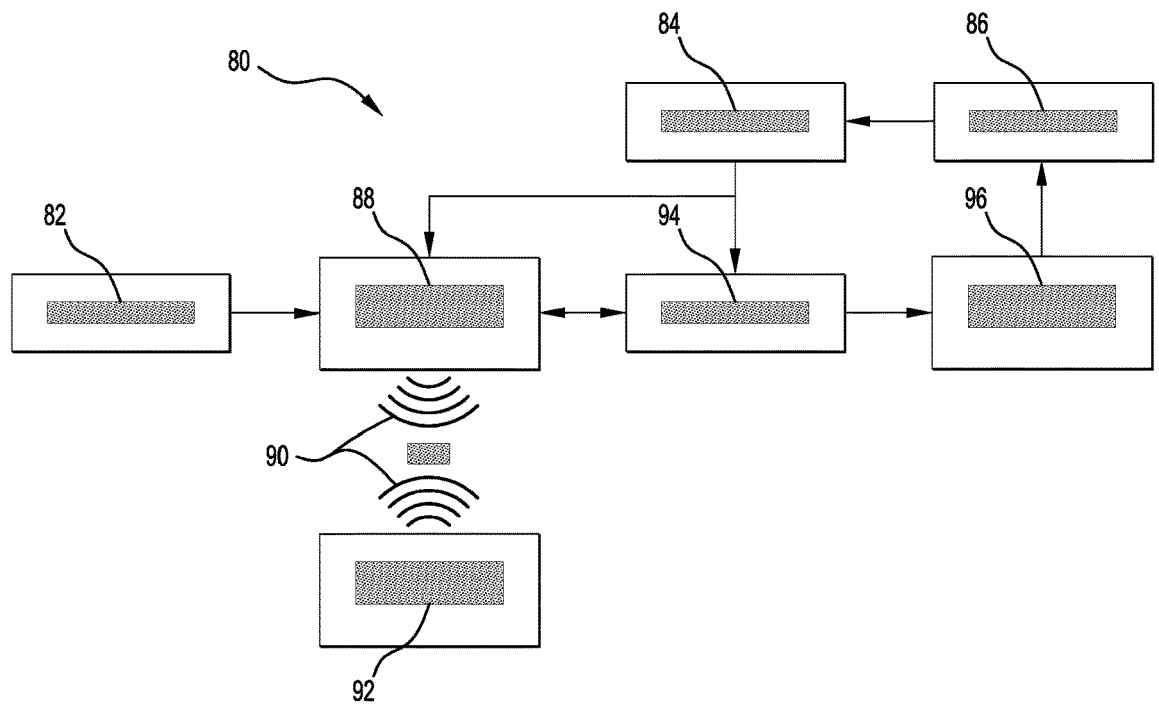
FIG. 4 is a diagram showing an overview of components in an embodiment of the present invention.

FIG. 4 is a diagrammatic representation 80 of main system components (subsystems) in an embodiment of the present invention. The components in this embodiment include a trigger 82, a power supply 84, a general purpose outlet (GPO) 86, which may also be described as a power socket, an electrical supply device, or power outlet socket, a Bluetooth® transceiver 88 for communicating switching time data between the programmable control device 10 and an external programming device (via a user interface) 92, the communication being by radio frequency (RF) signals 90. The device 10, in this embodiment, also includes a microprocessor 94, which in certain embodiments, may be co-located in a single unit with others of the components/subsystems. The device 10 also includes a mains power control 96, including a switching module controlled by the microprocessor 94 (also simply referred to as a processor).

Figure 5:
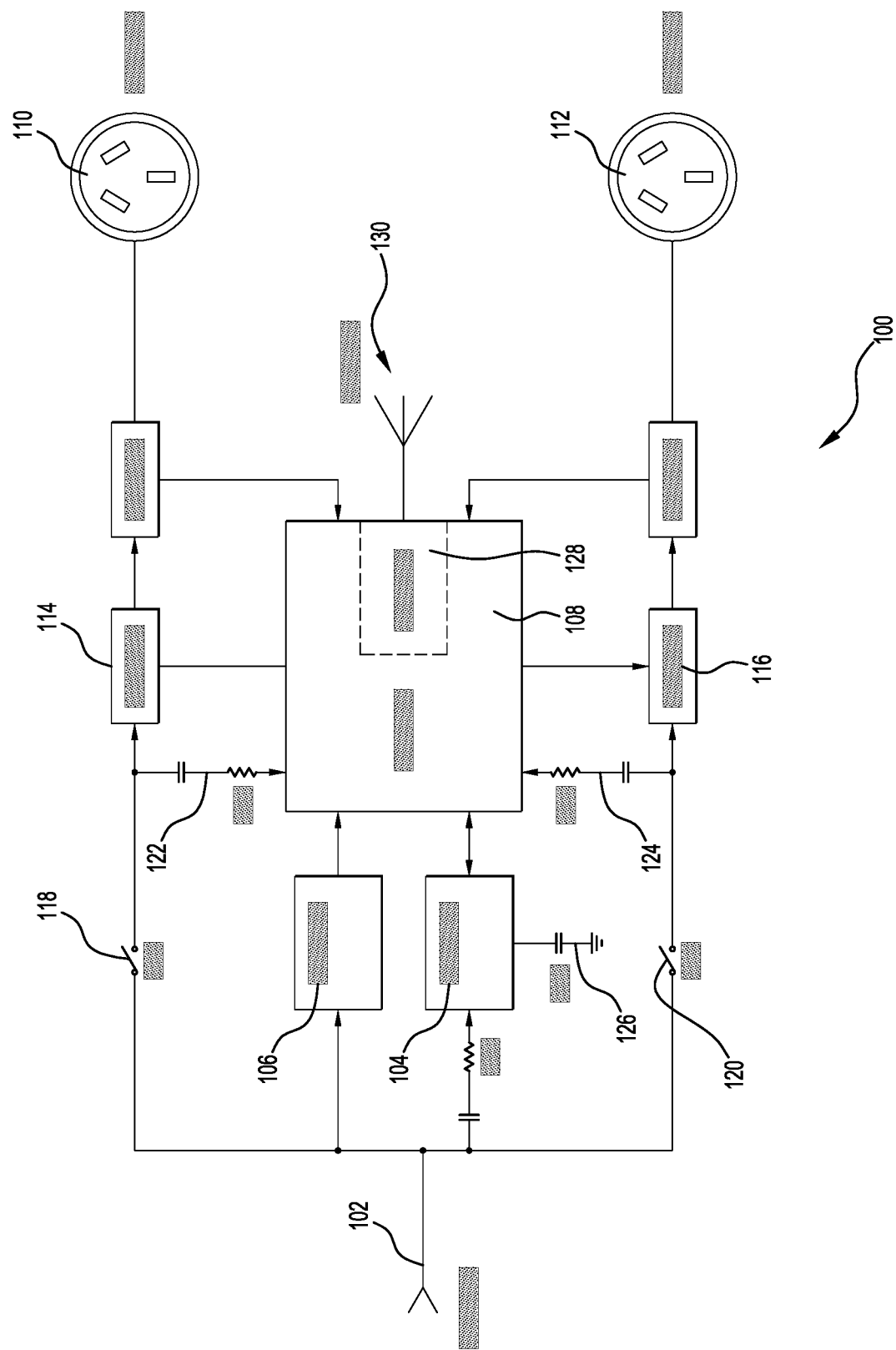
FIG. 5 is a diagram showing an example circuit layout in an embodiment of the present invention.

FIG. 5 is a diagrammatic representation of a circuit layout (circuit typology) 100 for an embodiment of the present invention. The circuit has mains electrical supply 102 (also referred to as an electrical power supply input), with in this embodiment and other described embodiments is alternating current (AC). The components in the circuit include a real-time clock (RTC) 104, also described as a timing module, an offline power supply 106 for providing appropriate power supply (typically a stepped-down direct current (DC) electrical supply) to the microcontroller unit (MCU) 108. The circuit diagram 100 also shows two sockets, a first GPO 110 and a second GPO 112. The device 110 can allow or prevent power supply to the GPOs 110, 112 by operation of a respective first relay 114 and a second relay 116. The relays are controlled via the micro controller unit 108.

The circuit diagram 100 also shows the first GPO switch 118 and the second GPO switch 120, which are diagrammatic representations of the manual switches in the electrical switching device. In this embodiment, the circuit also includes a first GPO switch detect 122 and a second GPO switch detect 124, which are for detecting whether the respective GPO is switched on or switched off. In other embodiments, the programmable electrical control device is in part or whole integrated into an electrical supply device without manual switches.

The device 10 also include a power outage capacitor 126 for powering the RTC 104 during, for example, blackouts or other power-off events.

The MCU 108 incorporates a low power Bluetooth® transceiver 128, including a Bluetooth® antenna 130 for communicating switching time data between the programmable electrical control device 10 and an external programming device.

Figure 6:
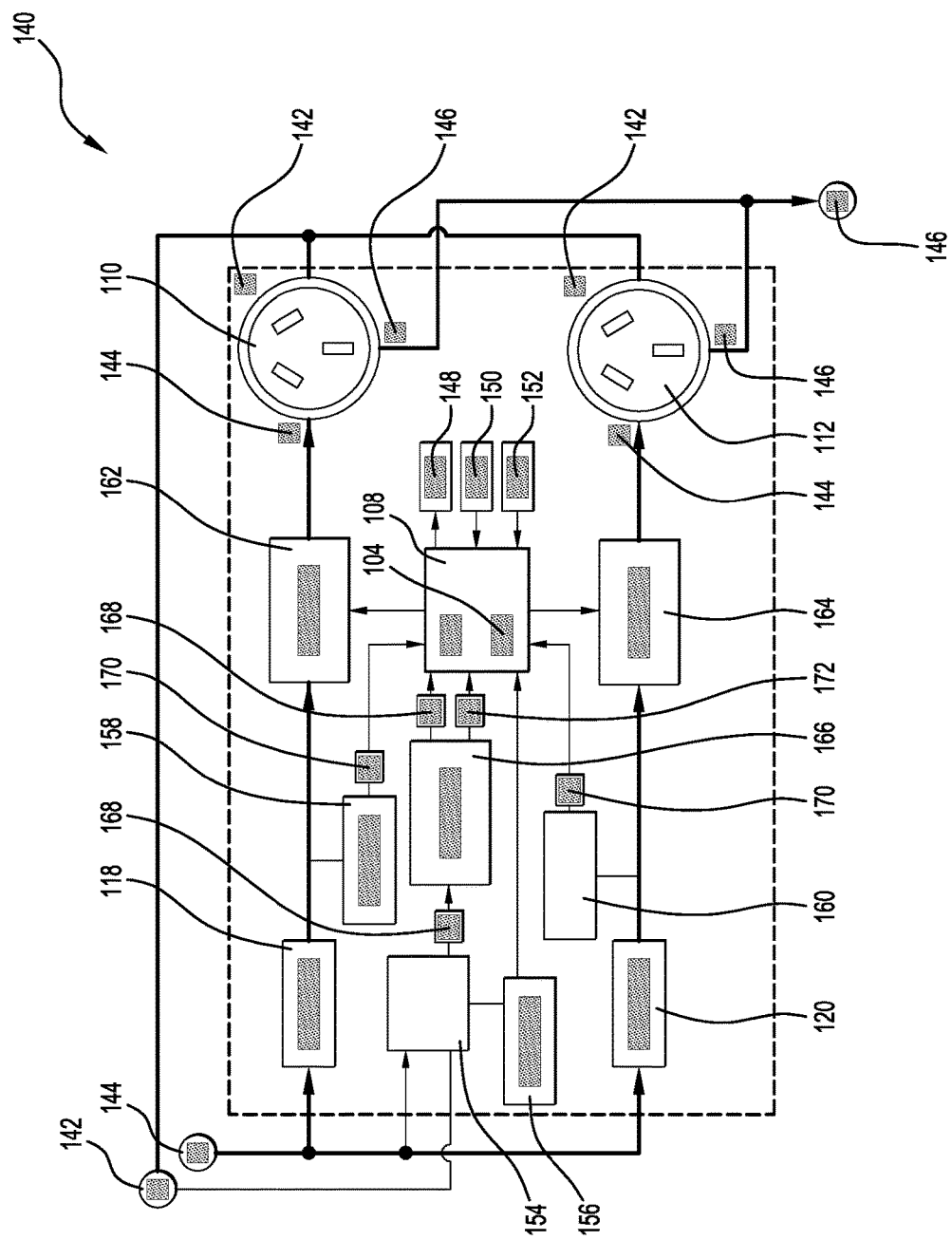
FIG. 6 is a diagram showing another circuit layout in another embodiment of the present invention.

FIG. 6 is another diagrammatic representation of 140 of a circuit typology for an alternative embodiment of the present invention. In this representation 140, the different components of AC electrical supply are indicated, including "neutral" indicator 142, "ACTIVE" indicator 144 and "EARTH" indicator 146. It will be understood that these represent the common labels applied to a three component AC Power Supply in Australia, but could also represent other similar types of power supply in other regions. In FIG. 6, the thicker lines and arrows represent the components 142, 144 and 146 of the mains AC power supply.

In FIG. 6, the diagram 140 includes a LED indicator 148, which show that the device is in Bluetooth® pairing state with an external programming device. The Bluetooth® pairing is activated with a button 150, and Bluetooth® communication is received with an antenna 152.

In this embodiment, the device 10 includes an offline AC/DC regulator 154, which may be a low drop-out regulator for stepping down voltage for powering the MCU 108. This is done to allow an energy storage system (the energy storage and charge controller 166) to be charged to a higher voltage as required for powering the RTC 104 for the required duration during a blackout event. The device 10 also includes a mains clock synchroniser 156, which is able to synchronise the RTC 104 using the frequency of the AC mains power supply.

The diagram 140 also shows a first outlet switch monitor 158 and a second outlet switch monitor 160 for indicating whether the outlet switches 118 and 120 are switched on or switched off. The programmable electrical control device 10 is able to allow or prevent electrical power to be supplied to the GPOs 110, 112 by AC power switches 162 and 164. These AC power switches may be implemented as relays, latching relays or mains switching TRIACs. It will be understood that a TRIAC is regarded as being superior to either relays or latching relays in speed of operation, connectivity to a micro controller, package size and cost. However, a TRIAC has a disadvantage in drawing power when turned off and dissipating energy when switched on.

In the diagram 140 there is also shown "DC" indicators 168, which indicate that a DC electrical power supply is flowing from the offline AC/DC regulator 154 to the energy storage and charge controller 166, a DC electrical current flowing from the energy storage and charge controller 166 to the MCU 108. The diagram also shows "SW on" indicators 170 demonstrating communication of a switched on state from the outlet switch monitors 158, 160 to the MCU 108. Also shown in the diagram is a "POK" indicator, which is a power ok communication from the energy storage and charge controller 166 to the MCU 108.

It will be understood that the hardware designs, components and circuit layouts depicted diagrammatically in FIG. 5 and FIG. 6, are intended to result in low power consumption in operation, so as to result in net power saving when programming the device 10 to switch off power as often and as long as possible as desired by a user. In this regard, the particular topologies and components are selected and designed for maximum reduction of power during operation, given other restraints and considerations, such as mandated safety compliance and cost of manufacture.

Figure 7:
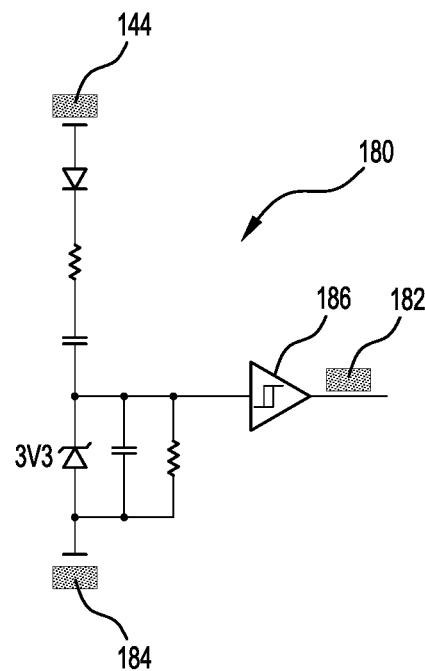
FIG. 7 is a diagram showing circuit topology for a basic real-time clock (RTC) AC mains clock synchronization circuit.

FIG. 7 is a diagrammatic representation 180 of a detail in the circuit typology for a basic RTC AC mains clock synchronisation circuit. The clock synchronisation circuit includes a clock synch 182, a ground 184 and a Schmitt trigger of 86.

Figure 8:
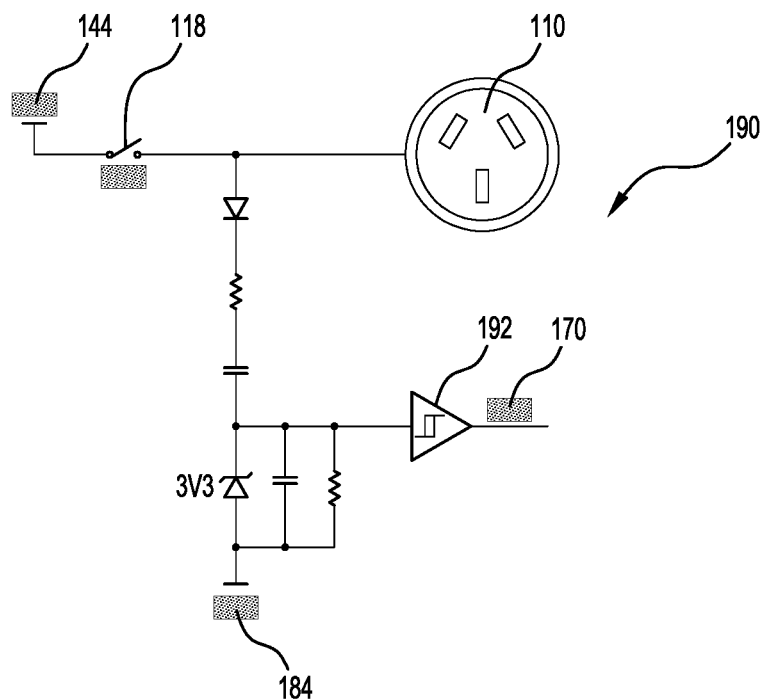
FIG. 8 is a diagram showing a circuit topology for an outlet switch monitoring circuit in an embodiment of the present invention.

Similarly, FIG. 8 is a diagrammatic representation of a circuit typology 190 for an outlet switch monitoring component, also having a Schmitt trigger 192.

Figure 9:
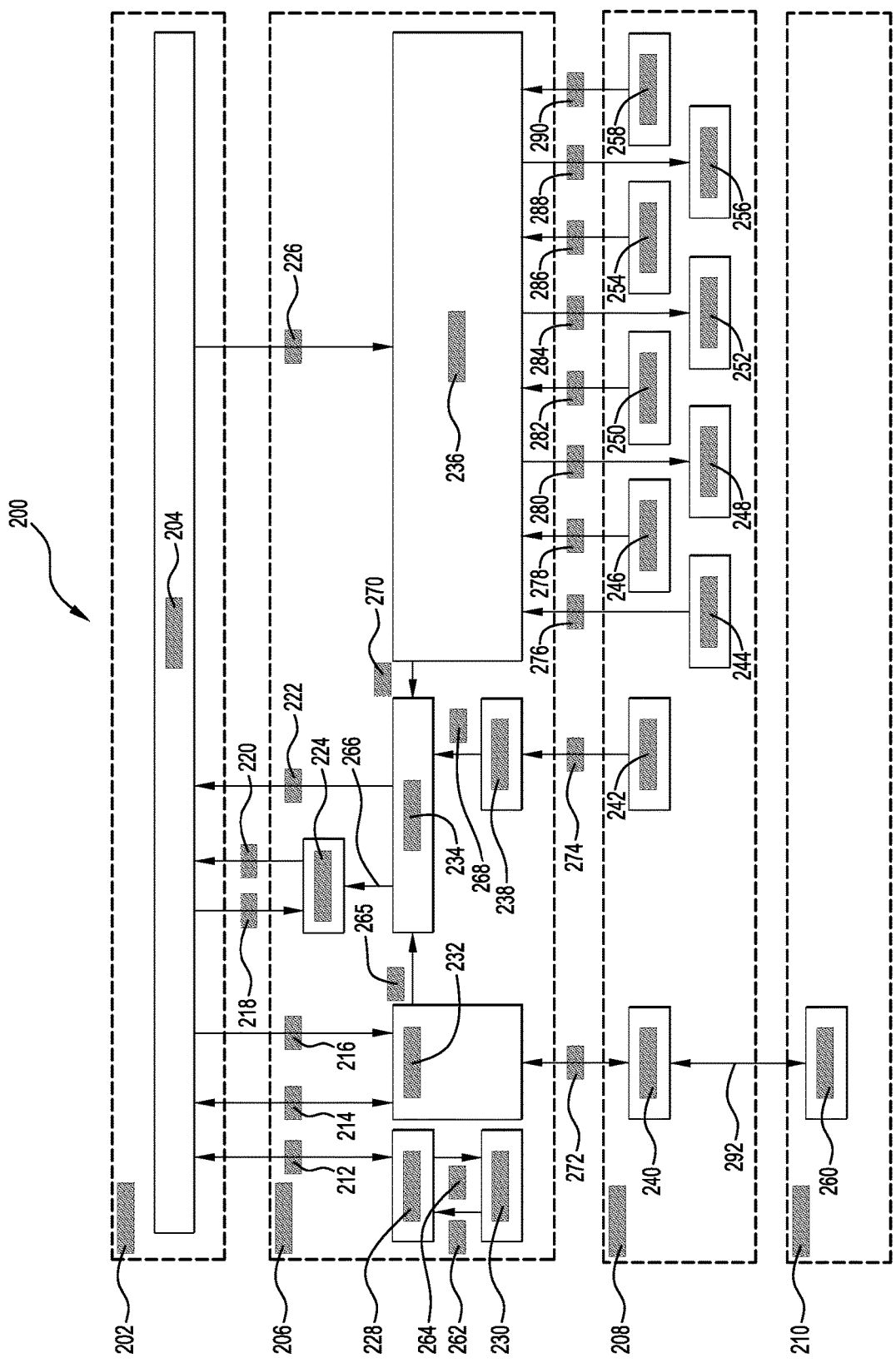
FIG. 9 is a diagram showing components of an embodiment of the present invention.

FIG. 9 is a diagram 200 showing component layers for a system in accordance with an embodiment of the present invention. The system includes various layers, including an application layer 202, an application logic layer 204, a driver layer 206, a hardware layer 208, along with external device (s) 210.

The application logic layer 204 is contained within the application layer 202 and interacts with components in the driver layer 206. The driver layer includes a configuration manager 228, a flash memory driver 230, a Bluetooth® driver 232, an event manager 234, a general purpose input output (GPIO) driver 236, and a hardware timer driver 238. The hardware layer 208 includes a Bluetooth® 240, a crystal 242, a voltage regulator 244, Bluetooth® pairing button 246, a Bluetooth® pairing LED 248, a first outlet switch monitor 250, a first AC power switch 252, a second outlet switch monitor 254, a second AC power switch 256 and a mains clock synchroniser 258. The external devices 210 include a Bluetooth® smart device 260.

In the diagram of components 200, it is shown that configuration data 212 is exchanged between the configuration manager 228 and the application logic layer 204. Wireless data 214 is communicated between the Bluetooth® driver 232 and the application logic layer 204. Commands 216 are communicated from the application logic layer 204 to the Bluetooth® driver 232. Updates 218 are communicated from the application logic layer 204 to the RTC 224 and time (including clock time/calendar dates) 220 is communicated from the RTC 224 back to the application logic layer 204. Events 222 are communicated from the event manager 234 to the application logic layer 204. Again, commands 226 are communicated from the application logic layer 204 to the GPIO driver 236.

Within the driver layer 206 there is communication between various of the components, including: resets 262 from the flash memory driver 230 to the configuration manager 228 and rights to 64 from the configuration manager 228 to the flash memory driver 230. The Bluetooth® driver 232 communicates Bluetooth® events 265 to the event manager 234, the hardware timer driver 238 communicates tick events 268 to the event manager 234 and the GPIO driver 236 communicates GPIO events 270 to the event manager 234. The event manager further communicates tick events 266 to the RTC 224.

The following communications occur between the components of the hardware layer 208 and components of the driver layer 206. The Bluetooth® antenna 240 communicates Bluetooth® RF 272 to the Bluetooth® driver 232, the crystal 242 communicates timing 274 to the hardware timer driver 238, the voltage regulator 244 communicate "POK" (POWER OK) 276 to the GPIO driver 236, the Bluetooth® pairing button 246 sends a pairing switch press communication 278 to the GPIO driver, the Bluetooth® pairing LED 248 receives on/off information from the GPIO driver, the first outlet switch monitor 250 sends on/off information to the GPIO driver, the first AC power switch 252 receives on/off communications 284 from the GPIO driver, the second outlet switch monitor 254 sends on/off information 286 to the GPIO driver, the second AC power switch 256 receives on/off information 288 from the GPIO driver and the mains clock synchronisation 258 sends a pulse 290 to the GPIO driver 236.

There is Bluetooth® RF communication 292 between the Bluetooth® smart device 260 in the external devices layer and the Bluetooth® antenna 240 in the hardware layer 208.

It will be appreciated that the PCB of the programmable electrical control device, along with the components on that PCB, will be formed to take a shape as needed to integrate the PCB and components into a GPO, in such an embodiment. It will also be appreciated that the PCB, due to its relatively small size, may have inherently small gaps between conductors in the PCB, thus increasing the risk of dendritic growth and fouling (creepage) between the PCB tracks. A standard power point does not commonly have this issue due to large and widely spaced metal bus bars. Accordingly, in embodiments, it is envisaged that extra PCB insulation may be an advantage. In one optional embodiment, the PCB insulation may be achieved by insulating the PCB, as a module, in a potting compound during manufacture.

One possible micro controller unit (MCU) to be used in the programmable electrical control device 10 is a Texas Instruments® CC2541. This particular MCU provides an integrated Bluetooth® low energy transceiver (Bluetooth® v 4.0 compliant protocol stack), along with general purpose I/O including GPIO pins and ADC channels. This MCU is specified as having relatively low power consumption, being only 1 µA during sleep mode with the internal RTC operating (if used).

Since the electronics may be enclosed in an insulating enclosure, a non-isolated AC/DC power supply may be used. An example power supply is the Monolithic Power Supplies® 156, which provides a single chip power supply with minimal supporting componentry supplying up to 3 W of regulated DC output power from 85-265 VAC, 50-60 Hz input supply. As it is a switching regulator, the MP156 also has the advantage of being more efficient and consuming less power than non-switched power supply designs over the operation temperature range of about −40 to +125° C.

In one embodiment, a low drop-out regulator (voltage regulator) may be used to step down voltage for powering the MCU. This is done to allow the energy storage system to be charged to a higher voltage, as required, for powering the RTC for the required duration during, for example, a blackout event. An example voltage regulator is the Fremont Micro Devices® FT531JA, which is a low quiescent current low drop-out regulator (LDO) rated up to 6V.

It will also be understood that it may be required to change the standard internal layout (including internal bus bars) of a GPO in order to accommodate the additional electronics of the programmable electrical control device. In an embodiment, two mains outlet switches are retained to control each outlet in series with the mains power controls switching element of the programmable electrical control device, along with the rear screw type wiring terminals.

To switch the mains outlets, the programmable electrical control device may use a relay, a latching relay or a mains switching TRIAC. One example relay is the TE Connectivity® RTD14005F, which has a switching rating of 16 A at 250 VAC, and a maximum switching voltage of 400 VAC. Further, this relay has a mechanical endurance rating of $30 \times 10^6$ cycles and a circuit break rating of $30 \times 10^3$ cycles at 16 A at a temperature of 85° C. Assuming an average of two switching cycles per day over a 15 year period, such a relay would operate to approximately 11,000 cycles.

Alternatively, if using a latching relay, one example is the TE Connectivity® 81393239-6 latching relay. However, such a relay is typically more expensive than a standard relay.

Another alternative is using a TRIAC, which is superior to relays in speed of operation, connectivity to an MCU, package size and cost. However, a disadvantage of a TRIAC is that is draws power when turned off and dissipates energy when switched on. An example TRIAC is the NXP Semiconductors® BTA316B-800B, 118.

To provide RTC clocking synchronization from the mains AC supply, a Schmitt trigger circuit may be used. An example of such a Schmitt trigger is the Fairchild Semiconductor® NC7NZ17. Further, an example RTC is the NXP Semiconductors® PCF2123BS/1,512. This RTC has relatively low current of 100 nA when run from a backup power source, hence minimising the size of the required RTC battery or capacitor. Alternatively, if an internal MCU RTC is used instead of the low current external RTC, brown-out protection time will be reduced to 10%. This may be advantageous in some circumstances.

In some embodiments, to allow the RTC to operate for a minimum of 72 hours during an electrical blackout, an energy storage component may be used. An example energy storage component is a 10 mF, or larger capacitor, which should provide a requisite battery lifetime when powering the RTC. An example capacitor is the Panasonic Electronic Components® ECA-1AM153, which is an aluminium electrolytic capacitor. However, one disadvantage of such a capacitor is its physical size and diameter, being approximately 18 mm and having a height of approximately 12.2 mm. Other smaller capacitors may be used, which have less capacitance.

In an embodiment, the programmable electrical control device includes means to monitor AC voltage for each outlet (GPO) to determine if an outlet switch is either on or off. A Schmitt trigger may be used for this purpose, as shown in FIG. 8.

In an embodiment implementing Bluetooth®, a Bluetooth® pairing button can be implemented by using the outlet switch (manual switch) of the GPO in conjunction with the outlet switch monitor. A change of either manual switch (in a two switch/two GPO electrical outlet) from on to off then back to the on state would activate the Bluetooth® pairing mode.

It has been found that the components as shown in FIG. 6 may draw up to 30 mW of power from the mains supply in a no-load condition. This may be equivalent to the state when both power outlets are turned off and the MCU is operating in low power mode, with only the RTC timer running. Depending on the outlet switching solution (the switching module) chosen, additional idle power losses may be incurred. If a TRIAC is used, this may add up to 0.5 mA leakage current per TRIAC. At 240 VAC, this would result in an additional power loss of 0.24 W.

If using a relay for the switching module, it will be recognised that relay switches have no off state idle leakage. However, when actuated, a relay draws about 0.4 W continuously.

If using a latching relay for the switching module, this only uses power to switch from one state to the other state. This may be considered in some embodiments as a most efficient solution.

Figure 10:
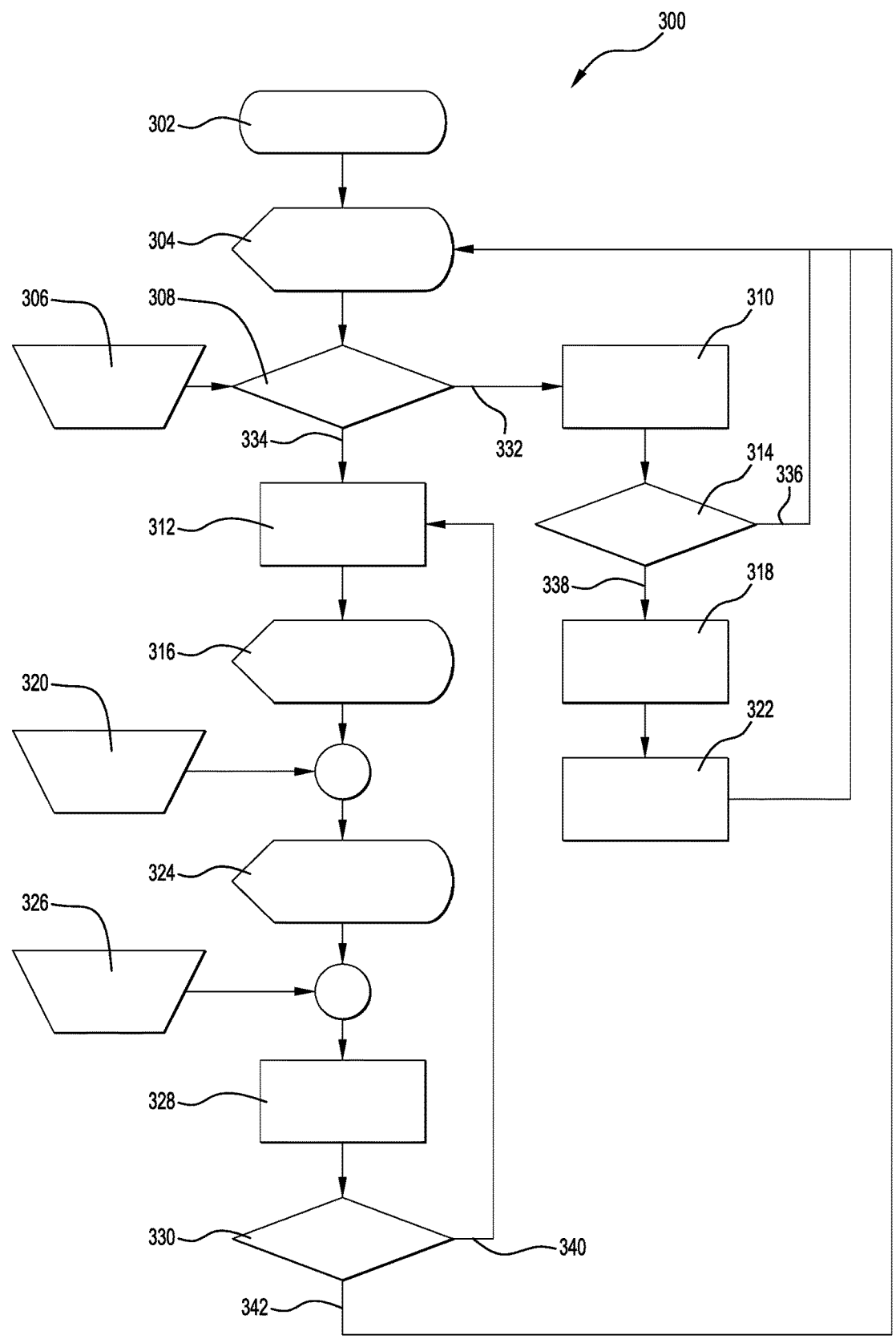
FIG. 10 is a flow chart diagram showing operation procedures for software to be used with an embodiment of the present invention; and, FIGS. 11 to 22 are diagrammatic screenshots for an application interface operating on an external programming device, used with an embodiment of the present invention.

FIG. 10 shows a flow chart 300 for the operation of software on an external programming device, such as a laptop computer or a smartphone. A user operating the software activates the software using a start/stop control 302, which may be implemented as a clickable screen icon. The software will then display 304 detected programmable electrical control devices 10 within the vicinity of the external programming device. The user can then select 306 a particular programmable electrical control device 10 for configuration, wherein the software detects whether the device has been selected 308. If the answer is "YES" 334 then the software can retrieve the device configuration 312 and then displays the device configuration 316. If the device is implemented in an electrical switching device (or an electrical supply device without manual on/off switches) with two electrical power supply outputs, then the user can select 320 which output (for example, the left output or the right output) is to be configured, and then the software displays 324 the configuration for that particular electrical power supply output.

When the configuration for the output is displayed 324 the user can set on/off days and time intervals 326, represent periods of supply on and supply off controlled by the device 10. When the switching times are input by the user 326, the software can upload the switching time data by communicating 328 the switching time data from the external programming device to the data connection module of the programmable electrical control device. The software then detects whether the configuration has been uploaded (communicated) 330 if the answer is "YES" 342 then the software operates to display the detected devices 304. If the answer is "NO" 340 then the software acts to retrieves the programmable device configuration information 312.

Returning to the decision point in the software of whether the particular device has been selected by the user 308, if the answer is "NO" 332 then the software can act to detect devices 310. The software will then determine whether a device has in fact been detected 314. If the answer is "NO" 336 then the software will return to the display of detected devices 304. If the answer is "YES" 338, then software can act to adjust the device clock 318 and then act to add the device to the device list 322, where upon it returns to the display of detected devices 304.

It will be understood that the software flowchart 300 in FIG. 10 is only an example of how software could operate on an external programming device. It will be understood that the external programming device and its software do not constitute part of the programmable electrical control device 10, but may be implemented as part of an electrical control system including the programmable electrical control device and the external programming device with its operating software.

FIGS. 11 to 22 are representations of a smartphone 350 with a screen 352 displaying a number of different aspects of a software interface. A smartphone 350 is an example of an external programming device, which operates with the programmable electrical device 10. The smartphone 350 includes a smartphone operating button 354.

All the interface screens 352 display a product logo 356 for the programmable electrical control device and/or a particular software product for operating on the external programming device to program the programmable electrical control device 10.

Figure 11:
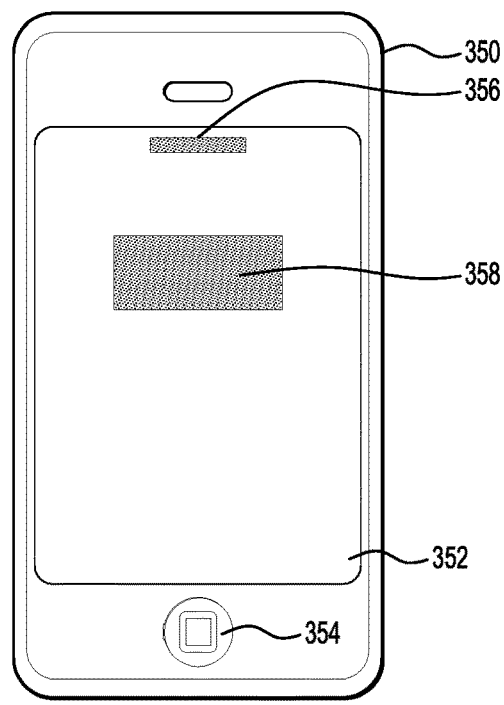

FIG. 11 shows a screen indicating "DEVICE DETECTED" 358, which indicates that at least one programmable electrical control device has been detected by the software.

Figure 12:
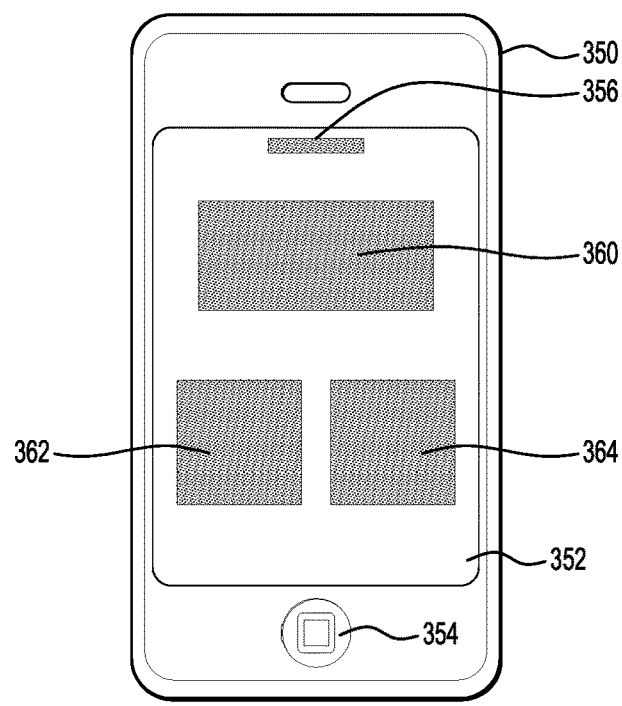

FIG. 12 shows a screen in the software inviting the user to "CONNECT?" 360, with "YES" 362 and "NO" 364 screen buttons.

Figure 13:
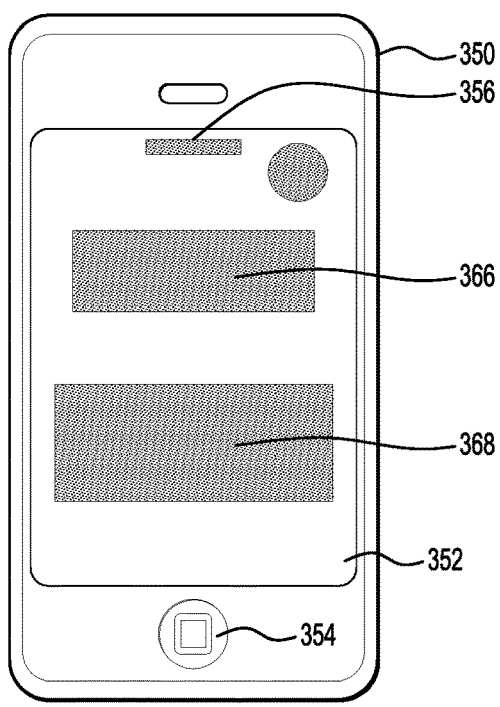

FIG. 13 shows a screen of the interface including a "SET TO DEFAULT" screen button 366 and a "SET PROGRAMMING FUNCTION" screen button 368. If the user chooses "SET TO DEFAULT", the software can use a default programming setting including standard switching times and can communicate those switching times from the external programming device to the programmable electrical control device through the data connection module. If the user selects "SET PROGRAMMING FUNCTION", then the user can set the supply on periods and supply off periods for selected days and times.

Figure 14:
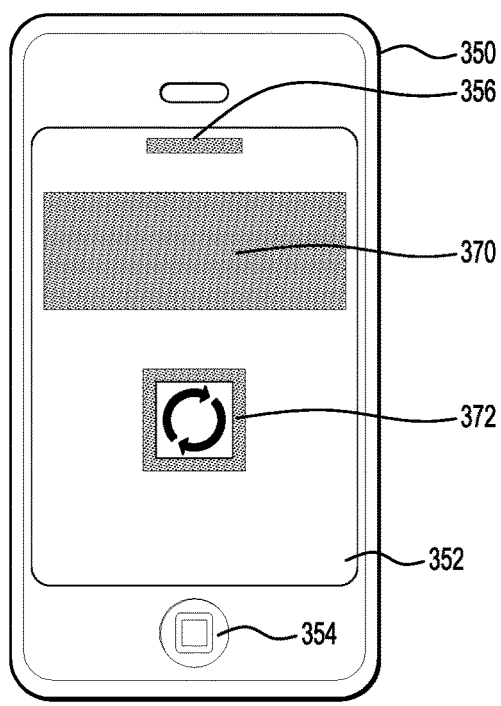

FIG. 14 shows a screen of the interface indicating that the software is operating for "SYNCHRONISING TIME AND DATE" 370 and show a progress indicator 372.

Figure 15:
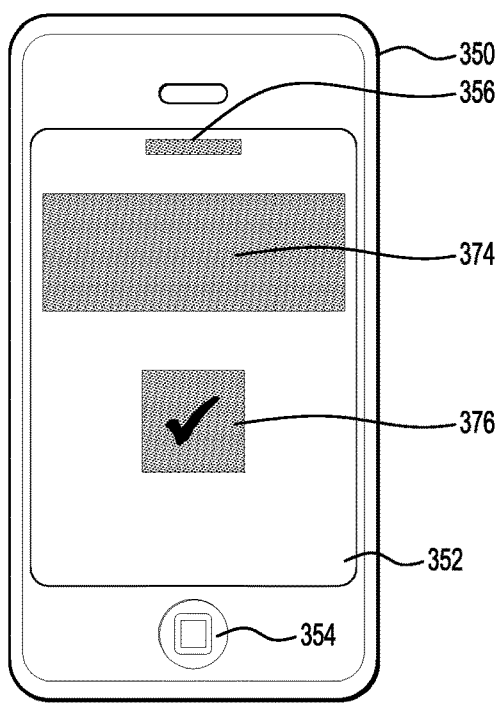

FIG. 15 shows a screen of the interface displaying to the user that the "SYNCHRONISING TIME AND DATE" has been "SUCCESSFUL" 374, along with a success indicator 376, being a tick symbol.

Figure 16:
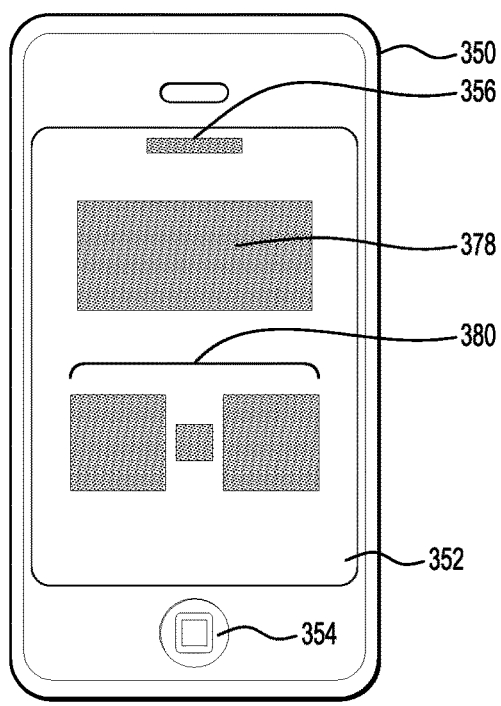

FIG. 16 shows a screen of the interface inviting a user to select to "PROGRAM" 378 either a "LEFT or RIGHT" outlet socket 380 in an electrical switching device, such as a general power outlet.

Figure 17:
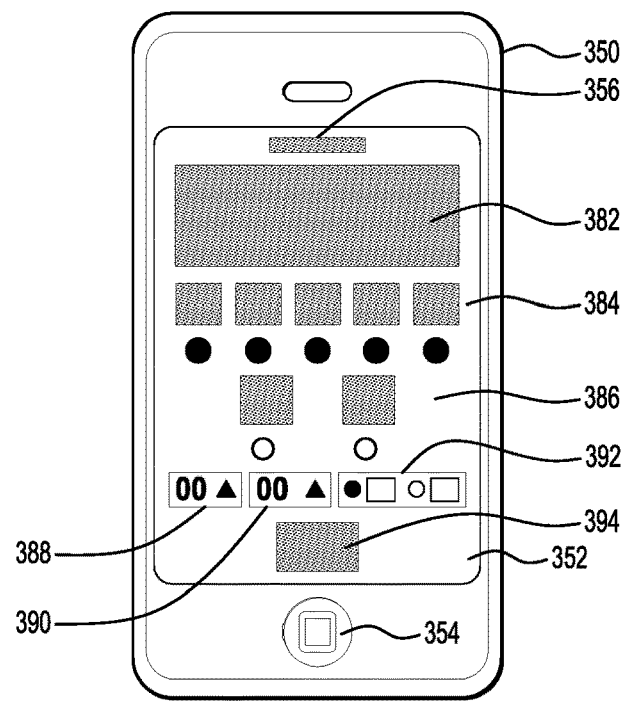
Figure 18:
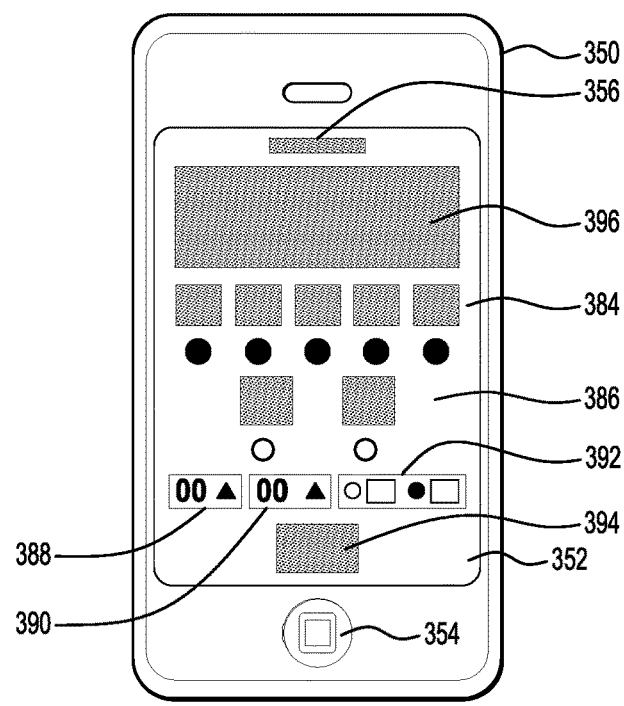

The user can select either the "LEFT OR RIGHT" power outlet, such that switching times for that power outlet can be programmed into the software and then communicated as switching time and data between the external programming device and the data connection module in the programmable electrical control device for controlling the supply on period and the supply off period for that chosen power outlet. The software then displays a screen as shown in FIG. 17 which is adapted to receive input to "SET TIME TO SWITCH ON" 382. The interface screen includes screen buttons for selecting the days of the week (Monday, Tuesday, Wednesday, Thursday, and Friday) 384, along with the days of the weekend (Saturday and Sunday) 386. Each of the days has an indicator below the day name to show whether that day has been selected. In this example, the black circles represent selected days, and the white circles represent non-selected days. The screen also includes an hour input selector 388 a minute input selector 390 and an AM/PM selector input 392. When the user has selected the days and the switch on time for those days, the user can then press the "SET" screen button 394 to update the configuration information in the software for the chosen outlet socket in the electrical switching device (or the electrical supply device without manual on/off switches). Similarly, FIG. 18 shows a screen which allows the user to "SET TIME TO SWITCH OFF" 396, which has all the day and time entry buttons and indicators as for the set time on screen in FIG. 17.

Figure 19:
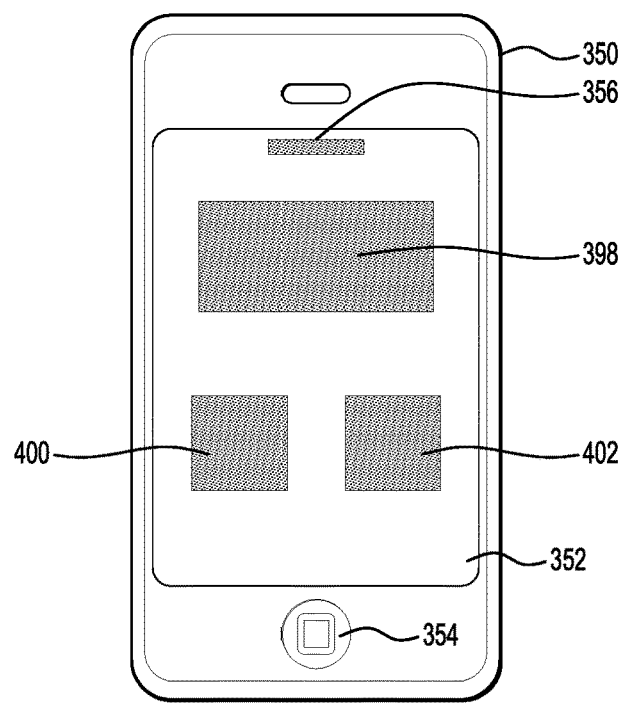
Figure 20:
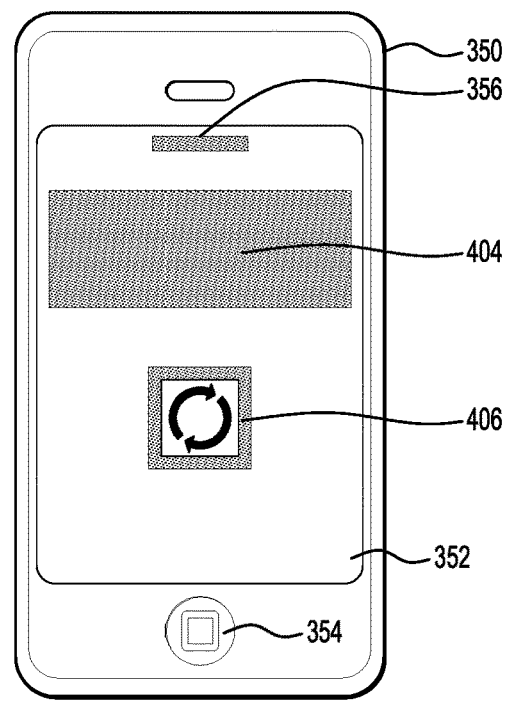
Figure 21:
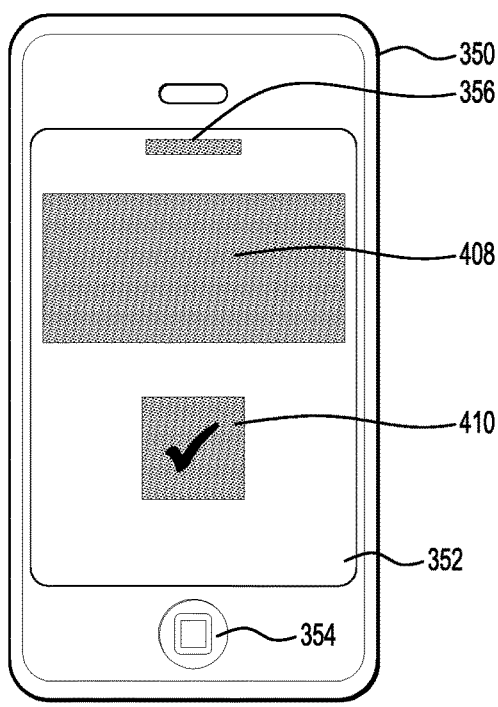

Once the user has input desired switching times for the supply on and supply off periods for the selected socket in the electrical switching device (or the electrical supply device without manual on/off switches), the software can then display a screen as in FIG. 19 asking the user "DO YOU WANT TO PROGRAM THE OTHER SIDE?", and provide a "YES" screen button 400 and a "NO" screen button 402 for pressing by the user. If the user clicks "YES" 400, then the software will return the screens of FIGS. 17 and 18 to set the on and off switching times to be programmed into the programmable electrical control device to operate the socket on the other side of the electrical switching device (or the electrical supply device without manual on/off switches). If the user selects "NO" 402, then the software will perform an optional "SYSTEM CHECK" 404 and display a system check progress indication 406, as shown in FIG. 20. FIG. 21 shows a screen wherein the software has determined "SYSTEM CHECK SUCCESSFUL" 408 with an additional indicator 410, being a tick.

Figure 22:
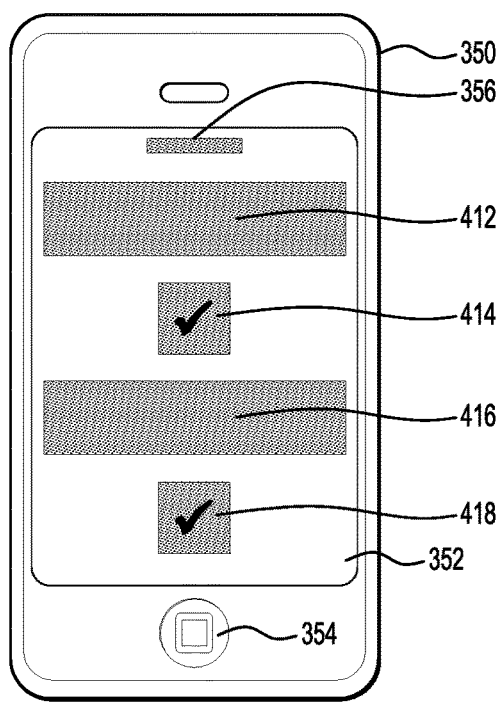

At the end of the operation of the software, as exemplified in FIGS. 11 to 21, the software will then display interface screen as shown in FIG. 22 to indicate "END PROGRAMMING" 412, with an additional indicator to show successful end of programming 414 (being a tick), along with an indication that the software has acted to "DELETE PAIRING" 416, along with additional indicator 418, showing that the software has acted to stop the pairing for communication between the external programming device and the data connection module of the programmable electrical control device 10.

In a further embodiment (not shown), the data connection module is embodied as a separate device, which is adapted to be plugged in to the power outlet socket of the electrical switching device 12 (or the electrical supply device without manual on/off switches). For convenience, the separate data connection module will be referred to in this description as a "dongle".

In various countries, power outlet sockets are configured with two or more pins or terminals. In Australia, for example, a standard power outlet socket includes three terminals, and most plugs include three corresponding pins for insertion into the three terminals.

An example implementation of the dongle, in an embodiment of the present invention, includes a single pin for insertion into a respective terminal of an Australian standard power outlet socket. The dongle includes the means for data connection to a external programming device, for example, a USB port, a Wi-Fi® transmitter/receiver or a Bluetooth® transmitter/receiver, using appropriate communication protocols. Further, the dongle may include means for data connection to multiple different external programming devices, using different data communication protocols. In other optional embodiments, the dongle may have two or more pins/terminals for plugging into two or more respective terminals/pins of the socket.

The dongle may also include an indicator light or other display for showing connection status or other information. A display may also be implemented as an LCD, or similar, display for displaying state or other information.

One advantage of providing program input via a separate device (dongle) is that the complexity of the programmable electrical control device (or part thereof) situated in the electrical switching device (or the electrical supply device without manual on/off switches) can be substantially reduced. In other words, the programmable electrical control device situated in a power outlet need not include transmission/receiving components for receiving instructions and transmitting state information from/to the external programming device.

A further advantage of having a separate dongle is that a user could purchase, for example, a number of power outlets with the programmable electrical control device (or part thereof) integrated, but would only need purchase one separate dongle, which could be plugged into the power outlet socket of each power outlet for programming the respective programmable electrical control device as needed.

Clearly such an optional embodiment would result in reducing the manufacturing complexity of the programmable electrical control device for integration into each power outlet, and would also reduce the cost of manufacturing such a unit.

The present invention, in embodiments, may be designed so that it is integrated with an electrical switching device (or an electrical supply device without manual on/off switches), such as a domestic power outlet or light switch. Such a unit may be used when building a new structure, or may be retro-fitted to an existing structure.

Where the programmable electrical control device, has integrated with, for example, a power outlet, is retro-fitted, the existing power outlet (without a programmable electrical control device) can be removed and the new power outlet with an integrated programmable electrical control device can be wired in to the power supply, and then programmed by the user, using an external programming device.

Where a separate dongle is provided as the program input, the user may prefer to fit (or retro-fit) a number of power outlets in to a building. In such an example, the user can buy, say, five power outlets with integrated programmable electrical control device and one dongle for programming all of the devices. The user (or electrician) fits the power outlets (each with its integrated programmable electrical control device). When fitted, the dongle can be inserted into the power outlet socket. The user then employs the external programming device to connect to the dongle, and then program the programmable electrical control device with instructions for switching times using the external programming device via the dongle. The dongle is then unplugged from the power outlet socket and inserted into another power outlet socket to program the other power outlet's programmable electrical control device.

In another embodiment, the dongle may be stored in, or attached to, the body or faceplate of the power outlet. In one alternative embodiment, the power outlet has a cavity in which the dongle can be stored, further including a sprung press release and press store system. The dongle may also be attached to the power outlet via a clipping device. In this way, it is less likely that a user would lose the dongle.

In accordance with the present invention, the programmable electrical control device 10 is programmable with switching times including at least one supply on period during which the programmable electrical control device is in an on state, such that the electrical switching device is able to supply electrical power when the manual switch is on, and at least one supply off period during which the programmable electrical control device is in an off state, such that the electrical switching device is unable to supply electrical power when the manual switch is either on or off.

In other embodiments, the programmable electrical control device 10 is programmable with switching times including at least one supply on period during which the programmable electrical control device is in an on state, such that the electrical supply device (not having manual on/off switches) is able to supply electrical power, and at least one supply off period during which the programmable electrical control device is in an off state, such that the electrical switching device is unable to supply electrical power.

It will be understood by a person skilled in the art that the switching times could include an arbitrary number of supply on period and supply off periods within, for example, a twenty four (24) hour timeframe. Furthermore, it will be understood that the programmable electrical control device may be programmed in such a way as to repeat the same cycle of supply on and supply off periods within a twenty four hour timeframe for an arbitrary number of consecutive days. Moreover, the programmable electrical control device may be programmed to repeat a non-twenty four (24) hour cycle of supply on periods and supply off periods over, for example, a week, or a number of weeks.

In a further alternative embodiment, the programmable electrical control device may be programmed with instructions for switching times, wherein those switching times are random, or pseudo-random supply on and supply off periods. Of course, the random supply on and supply off periods could be limited to having a minimum time and a maximum time.

Embodiments of the programmable electrical control device may also include over-ride means. An over-ride would allow the electrical switching device to provide electrical power supply during a supply off period.

An over-ride may be implemented by using the manual switch of the electrical switching device. In an example scenario, the programmable electrical control device is in a supply off period, the manual switch of the electrical switching device is switched into its off position, in order to over-ride the supply off period, and the manual switch is switched on. The switching on of the manual switch during the supply off period activates the override means, such that the programmable electrical control device is switched to a supply on period and such that the electrical switching device is able to provide electrical power supply.

The over-ride means, which is activated during a particular supply off period remains activated during that programmed first supply off period, the programmed first supply off period will then change to the next supply on period (during which electrical power supply is programmed to be available through the electrical switching device). At the next programmed change to the supply off period, the electrical power supply is stopped by the programmable electrical control device, whether or not the manual switch is in an on or off position.

In the present specification, terms have been used which differ slightly from terms used in Australian Provisional Application No. 2012901567, from which the present application, in part, claims priority. An example concordance is given as follows:

| Term Used in Provisional Application Specification | Term Used in Present Application Specification |
| --- | --- |
| Programmable Device | Programmable Electrical Control Device |
| Electrical Power Supply | Electrical Switching Device (or Electrical Supply Device, which may not have manual on/off switches) |
| Program Input Device | External Programming Device |
| Program Input | Data Connection Module |
| First Means | A Processor |
| Second Means | A Switching Module |
| Instructions for Switching Times | Switching Time Data |

It will be recognised by a person skilled in the technology of the present invention that the above concordance in terminology is not an exact concordance for each and every term, but some terminology may have been changed in the present specification to more clearly describe and define the invention.

The invention is susceptible to variations, modifications and/or additions other than those specifically described, and it is to be understood by a person skilled in the art that the invention includes all such variations, modifications and/or additions, which fall within the scope of the following claim(s).

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference to any prior art in this specification is not and should not be taken as an acknowledgement or any form of suggestion that the prior art forms part of the common general knowledge.

The invention claimed is:

1. A programmable electrical control device adapted to be programmed by an external programming device, the programmable electrical control device for controlling electrical power supply in cooperation with an electrical supply device, the electrical supply device having a body, an electrical power supply input, at least one electrical power supply output, the programmable electrical control device comprising:
    a data connection module for communicating switching time data and/or duration data between the programmable electrical control device and the external programming device;
    memory for storing the switching time and/or duration data;
    a timing module for providing one or more of a clock time, a calendar date and a duration;
    a processor for processing the switching time data and/or duration data in accordance with one or more of the clock times and the calendar dates to provide switching time and/or duration; and a switching module controlled by the processor in accordance with the switching time and/or duration for controlling electrical power supply through the electrical power supply output, such that during the at least one supply on period the at least one electrical power supply output is able to supply electrical power, and during the at least one supply off period during the at least one electrical power supply output is unable to supply electrical power, wherein at least a part of the programmable electrical control device is capable of being integrated within the body.

2. The programmable electrical control device according to claim 1, wherein the data connection module comprises a wireless connector, including any one of a Bluetooth® transceiver, a WiFi® transceiver and/or an infra-red transceiver.

3. The programmable electrical control device according to claim 1, wherein the timing module is a real-time clock (RTC).

4. The programmable electrical control device according to claim 1, wherein the switching module is any one of a relay, a latching relay or a triode for alternating current (TRIAC).

5. The programmable electrical control device according to claim 1, wherein the electrical supply device is a power outlet and the electrical power supply output is a power outlet socket for accepting a plug of an electrical device, the power outlet socket comprising two or more pins and/or terminals for accepting two or more respectively corresponding terminals and/or pins of the plug.

6. The programmable electrical control device according to claim 1, wherein the electrical supply device is a light switch and the electrical power supply output is a light socket.

7. The programmable electrical control device according to claim 1, wherein the external programming device is any one of a personal computer, comprising a laptop computer, a desktop computer, and the like; a smart phone; a remote control; and the like.

8. The programmable electrical control device according to claim 1, further comprising an over-ride function, wherein the over-ride function can over-ride a supply on period to stop electrical power supply and the over-ride function can over-ride a supply off period to allow electrical power supply.

9. The programmable electrical control device according to claim 8, wherein the over-ride function is operable from the external programming device.

10. An electrical control system comprising a programmable electrical control device, the programmable electrical control device being in accordance with claim 1, wherein the programmable electrical control device is integrated with an electrical supply device, the electrical supply device being in accordance with the preamble of claim 1.

11. The electrical control system according to claim 10, further including an external programming device to program the programmable electrical control device.

12. A method of controlling electrical power supply through at least one electrical power supply output of an electrical supply device, comprising:
receiving switching time and/or duration data;
processing the received switching time and/or duration data with one or more of clock times and calendar dates to provide switching time and/or duration comprising at least one supply on period and at least one supply off period; and
controlling electrical power supply through the at least one electrical power supply output in accordance with the switching time and/or duration such that during the at least one supply on period the electrical power supply output is able to supply electrical power and during the at least one supply off period the electrical power supply output is unable to supply electrical power.

13. The method of claim 12, wherein receiving switching time and/or duration data comprises establishing a connection for communication with an external programming device.

14. The method of claim 12, wherein receiving switching time and/or duration data comprises establishing a wireless connection with an external programming device.

15. The method of claim 12, further comprising storing the received switching time and/or duration data in memory.

16. The method of claim 12, wherein the switching time and/or duration data are received at a programmable electrical control device comprising a data connection module, memory, a timing module, a processor, and a switching module.

17. The method of claim 16, wherein processing the switched time and/or duration data comprises receiving one or more of a clock time, a calendar date, and a duration from the time module.

18. The method of claim 16, wherein controlling electrical power supply comprises controlling the switching module according to the switching time and/or duration.

19. A method of controlling electrical power supply through at least one electrical power supply output of an electrical supply device, comprising:
detecting one or more programmable electrical control devices for controlling electrical power supply;
selecting a programmable electrical control device from the detected programmable electrical control devices; and
transmitting switching time and/or duration data to the selected programmable electrical control device, wherein the switching time and/or duration data comprises supply on period data during which the electrical power supply output is able to supply electrical and supply off period data during which the electrical power supply output is unable to supply electrical power.

20. The method of claim 19, wherein the detecting is from an external programming device in a vicinity of the one or more programmable electrical control devices.

* * * * *